United States Patent
Brecher et al.

(10) Patent No.: US 9,444,669 B2
(45) Date of Patent: Sep. 13, 2016

(54) PEAK TO AVERAGE POWER RATIO REDUCTION OF OFDM SIGNALS

(71) Applicant: TEXAS INSTRUMENTS INCORPORATED, Dallas, TX (US)

(72) Inventors: Liran Brecher, Kfar Saba (IL); Shai Erez, Holon (IL)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/795,135

(22) Filed: Jul. 9, 2015

(65) Prior Publication Data

US 2016/0191110 A1    Jun. 30, 2016

Related U.S. Application Data

(60) Provisional application No. 62/098,136, filed on Dec. 30, 2014.

(51) Int. Cl.
| | |
|---|---|
| *H04L 27/26* | (2006.01) |
| *H04L 27/34* | (2006.01) |
| *H04B 17/00* | (2015.01) |
| *H04B 17/13* | (2015.01) |

(52) U.S. Cl.
CPC ....... *H04L 27/2623* (2013.01); *H04L 27/2614* (2013.01); *H04L 27/3411* (2013.01); *H04B 17/13* (2015.01)

(58) Field of Classification Search
CPC ........... H04L 27/2623; H04L 27/2614; H04L 27/3411; H04B 17/13
See application file for complete search history.

(56) References Cited

U.S. PATENT DOCUMENTS

| | | | | |
|---|---|---|---|---|
| 8,761,280 B1* | 6/2014 | Harris | ................. | H04L 27/2602 375/259 |
| 2008/0019453 A1* | 1/2008 | Zhao | ................... | H04L 27/2623 375/260 |
| 2010/0034186 A1* | 2/2010 | Zhou | ................... | H04L 27/2621 370/344 |
| 2010/0272195 A1* | 10/2010 | Rao | ..................... | H04L 27/3411 375/260 |
| 2012/0064848 A1* | 3/2012 | McGowan | .......... | H04L 27/2623 455/114.3 |
| 2014/0161202 A1* | 6/2014 | Gunturi | ............... | H04L 27/2623 375/267 |

OTHER PUBLICATIONS

Li et al., "A Tone Reservation Method Combining Linear Clipping and PRT-Aided Detection Algorithm," in Vehicular Technology Conference (VTC Fall), 2011 IEEE, pp. 1-5, Sep. 5-8, 2011.*
Khan et al.,"The WiMAX 802.16e physical layer model," in Wireless, Mobile and Multimedia Networks, 2008. IET International Conference on , pp. 117-120, Jan. 11-12, 2008.*
Sagar et al., "PAPR Reduction in OFDM Systems," International Journal of Engineering and Computer Science, vol. 3, Issue 4, Apr. 2014.*

* cited by examiner

*Primary Examiner* — Chieh M Fan
*Assistant Examiner* — Michelle M Koeth
(74) *Attorney, Agent, or Firm* — Ronald O. Neerings; Frank D. Cimino (57) ABSTRACT

A method includes processing an input sequence of samples of an orthogonal frequency division multiplexing signal (OFDM) to reduce a peak to average power ratio (PAPR) of the OFDM signal with given constraints of an error vector magnitude (EVM) parameter and a spectral mask parameter for the OFDM signal during a first processing iteration. The method includes performing at least one other iteration of the first processing iteration on a subsequent time domain sequence generated in the first processing iteration to reduce the PAPR of the OFDM signal below a system target PAPR threshold and below threshold limits for the EVM parameter and the spectral mask parameter.

16 Claims, 3 Drawing Sheets

PEAK TO AVERAGE POWER RATIO REDUCTION OF OFDM SIGNALS

CROSS-REFERENCE TO RELATED APPLICATION

This application claims the benefit of U.S. Provisional Patent Application 62/098,136 filed on Dec. 30, 2014, and entitled PEAK TO AVERAGE POWER RATIO (PAPR) REDUCTION OF OFDM SIGNALS, the entirety of which is incorporated by reference herein.

TECHNICAL FIELD

This disclosure relates signal processing and more particularly to a system and method to reduce peak to average power ratio of orthogonal frequency division multiplexing (OFDM) signals.

BACKGROUND

Peak-to-average power ratio (PAPR) of a signal refers to the ratio of peak instantaneous power to the average power, as measured over a period of time (or time window). Alternatively, the peak-to-average ratio also refers to peak amplitude of the signal envelope to the average amplitude of the signal envelope measured over a period of time. In general, peak-to-average power ratio represents the characteristic of the signal variations. For example, a signal with a high peak-to-average power ratio may contain rare/occasional peaks, spikes or overshoots. In general, a signal having high peak-to-average power ratio causes inefficiencies in processing the signal. For example, a power amplifier that amplifies a signal having a high peak-to-average ratio often works with low efficiency (e.g., consumes more power). Similarly, in case of an analog-to-digital (A/D) converter that converts a high PAPR analog signal to digital form, the entire dynamic range of the A/D converter is not efficiently utilized.

The reduction of PAPR in orthogonal frequency division multiplexing (OFDM) systems is beneficial because it improves the transmitter efficiency which is an important system parameter for conserving power in battery operated devices, for example. In one example conventional method, the PAPR of an OFDM signal can be reduced by analyzing the peaks of a given signal and reducing their absolute value. One option to achieve this goal is by clipping the base-band envelope to a certain threshold while maintaining the phase, where this operation is referred to as soft clipping. An issue with this approach is that it usually results in major degradation to other desired system parameters such OFDM signal quality which may be quantified by its error vector magnitude (EVM) and spectral mask, for example. In most communication standards and systems, there are strict requirements on the EVM and spectral mask properties of the signal and thus, the amount of PAPR reduction achievable by soft clipping alone is limited.

SUMMARY

This disclosure relates to a system and method to reduce peak to average power ratio of orthogonal frequency division multiplexing (OFDM) signals. In one example, a method includes processing an input sequence of samples of an orthogonal frequency division multiplexing (OFDM) signal to reduce a peak to average power ratio (PAPR) of the OFDM signal with given constraints of an error vector magnitude (EVM) parameter and a spectral mask parameter for the OFDM signal during a first processing iteration. The first processing iteration of the method include generating a sequence of data bins values from the input sequence of samples of the OFDM signal by transforming the input sequence of samples into the frequency domain. The method includes clipping an absolute value of each sample of the input sequence of samples of the OFDM signal in the time domain to a first PAPR threshold, wherein the first PAPR threshold is set below system target PAPR thresholds. This includes transforming the clipped input sequence of samples from the time domain into a frequency domain sequence that includes the sequence of data bins and a sequence of guard bins in the frequency domain. The method includes clipping a value of each of the guard bins in the frequency domain sequence and replacing the data bins with the values from the generating the sequence of data bins. The guard bins are clipped according to spectral mask thresholds set for the spectral mask parameter. The method includes transforming the data bins and the clipped guard bins from the frequency domain into a subsequent time domain sequence. The method includes performing at least one other iteration of the first processing iteration on the subsequent time domain sequence to reduce the PAPR of the OFDM signal below the system target PAPR threshold.

In another example, a method includes generating a sequence of data bins from an input sequence of samples of an orthogonal frequency division multiplexing (OFDM) signal by transforming the input sequence of samples into the frequency domain. The method includes clipping an absolute value of each sample of the input sequence of samples of the OFDM signal in the time domain to a first PAPR threshold, wherein the first PAPR threshold is set below system target PAPR thresholds. This includes determining an error sequence by subtracting the values of the clipped input sequence of samples from the values of the input sequence of samples. The method includes determining a modified clipped sequence by clipping each sample of the input sequence of samples and subtracting each value of the error sequence multiplied by a constant from each value of the clipped sequence. The method includes transforming the modified clipped sequence from the time domain into a frequency domain sequence that includes the sequence of data bins, a sequence of pilot bins, and a sequence of guard bins in the frequency domain. The method includes clipping a value of each of the guard bins in the frequency domain sequence, wherein the guard bins are clipped according to a constant value multiplied by spectral mask thresholds set for the spectral mask parameter. This includes transforming the data bins, the pilot bins, and the clipped guard bins from the frequency domain into a subsequent time domain sequence.

In yet another example, a system includes a receiver to receive an orthogonal frequency division multiplexing signal (OFDM). The system includes processor to process an input sequence of samples from the OFDM signal. The system includes a peak to average power ratio (PAPR) module operated by the processor to reduce the PAPR of the OFDM signal with respect to an error vector magnitude (EVM) parameter and a spectral mask parameter for the OFDM signal. The PAPR module includes executable processor instructions configured to generate a sequence of data bins from the input sequence of samples by transforming the input sequence of samples into the frequency domain. The instructions clip an absolute value of each sample of the input sequence of samples of the OFDM signal in the time domain to a first PAPR threshold, wherein the first PAPR threshold is set below system target PAPR thresholds and initially above threshold limits for the EVM parameter and the spectral mask parameter. The instructions determine an error sequence by subtracting the values of the clipped input sequence of samples from the values of the input sequence of samples. The instructions determine a modified clipped sequence by clipping each sample of the input sequence of samples and subtracting each value of the error sequence multiplied by a constant from each value of the clipped sequence. The instructions transform the modified clipped sequence from the time domain into a frequency domain sequence that includes the sequence of data bins, a sequence of pilot bins, and a sequence of guard bins in the frequency domain. The instructions clip a value of each of the guard bins in the frequency domain sequence, wherein the guard bins are clipped according to a constant value multiplied by spectral mask thresholds set for the spectral mask parameter. The instructions transform the data bins, the pilot bins, and the clipped guard bins from the frequency domain into a subsequent time domain sequence. The instructions perform at least one other iteration on the subsequent time domain sequence to reduce the PAPR of the OFDM signal below the system target PAPR threshold and below threshold limits for the EVM parameter and the spectral mask parameter.

DETAILED DESCRIPTION

This disclosure relates to a system and method to reduce peak to average power ratio (PAPR) of orthogonal frequency division multiplexing (OFDM) signals. The PAPR system and methods disclosed herein reduce PAPR of an OFDM signal while holding its respective Error Vector Magnitude (EVM) and spectral mask parameters within a desired range. Communication standards usually define strict requirements on EVM and the spectral mask and how to measure these values. The EVM is a measure for transmit signal quality and can be measured by a reference receiver. Spectral mask is the power of the signal outside its defined bandwidth. The system and methods disclosed herein includes initial processing in the time domain to reduce PAPR followed by a transformation to frequency domain (e.g., DFT) with further signal processing in frequency domain to control the EVM and spectral mask.

The frequency domain operation may increase the PAPR which can be further reduced in subsequent iterations. The frequency domain result can then be transformed back to time domain (e.g., IDFT) and may run through another iteration of the PAPR reduction process. Although the time domain and the frequency domain processing can be somewhat conflicting in that target PAPR reductions may not initially be met while intermediate EVM and spectral mask values may be outside of desired ranges, repeating the reduction processes for one or more iterations can gradually reduce the probability of high signal peaks while holding the EVM and spectral mask in the desired range. The overall reduced PAPR result after can be applied to a final soft clipping operation that corresponds to the desired PAPR value. In contrast to soft-clipping of the original signal which is very limited due to EVM and spectral mask constraints, the system and methods described herein can perform iterative processing in time-domain and frequency domain to produce a modified reduced signal, where the modified signal can then be substantially clipped while still holding the EVM and spectral mask in the desired range.

Figure 1:
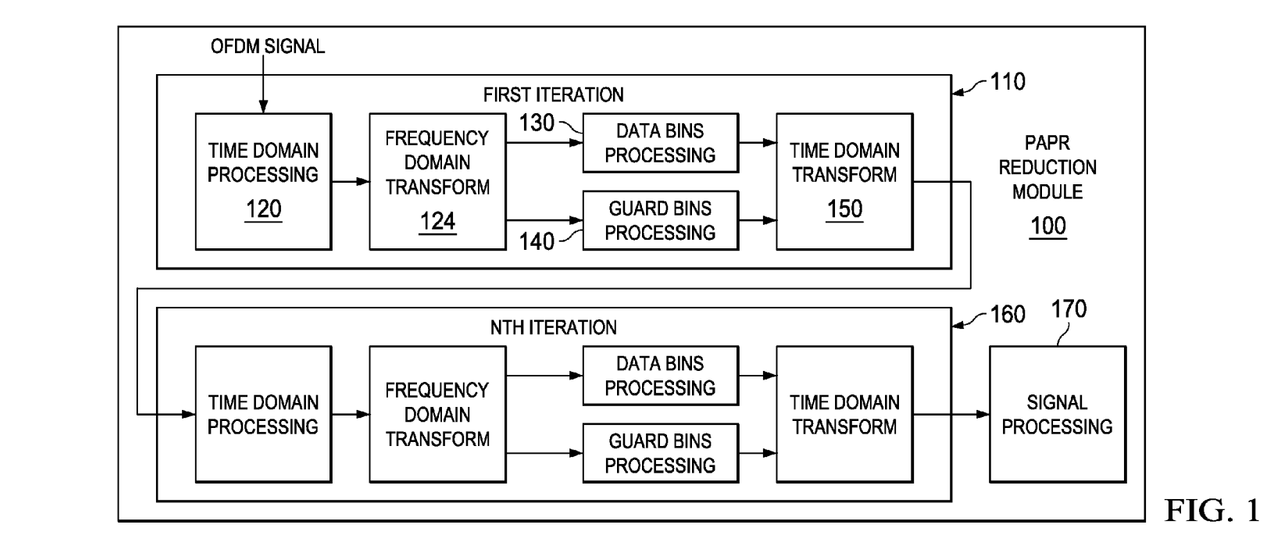
FIG. 1 illustrates an example block diagram of a peak to average power ratio (PAPR) reduction module for reducing PAPR of orthogonal frequency division multiplexing (OFDM) signals while holding OFDM signal quality parameters within a desired range.

FIG. 1 illustrates an example block diagram of a peak to average power ratio (PAPR) reduction module 100 for reducing PAPR of orthogonal frequency division multiplexing (OFDM) signals while holding OFDM signal quality parameters within a desired range. The PAPR module 100 and other modules described herein can be implemented as part of a circuit and/or integrated circuit. As used herein, the term circuit can include a collection of active and/or passive elements that perform a circuit function such as an analog circuit or control circuit, for example. The term circuit can also include an integrated circuit where all the circuit elements are fabricated on a common substrate, for example. The PAPR module 100 includes a first iteration block 110 where PAPR of an OFDM signal input is reduced over various processing iterations while holding signal quality parameters such Error Vector Magnitude (EVM) and spectral mask within desired threshold limits. The block 110 which includes executable processor instructions includes initial time domain processing at 120 to perform an initial PAPR reduction on the OFDM signal. After the initial PAPR reduction, a frequency domain transform 124 (e.g., Discrete Fourier Transform (DFT)) is applied to the reduced PAPR signal where data bins processing 130 and guard bins processing are performed on the transformed signal that has been reduced initially in the time domain. As used herein, the term bins refers to a mapping of zero's and one's data values from the received OFDM signal to constellation symbols which represents a complex set of numbers having a certain carrier amplitude and phase.

Data bins at 130 are typically segmented out from the OFDM signal stream where further frequency domain reductions are applied to guard bins at 140. The guard bins processing 140 has an effect on the EVM parameter and the spectral mask parameter. Such frequency domain processing may temporarily increase the initial PAPR reduction at 120 however further processing iterations can be applied to iteratively reduce the PAPR. Also, each EVM and spectral mask reduction in the frequency domain may initially be outside of desired threshold limits for these parameters but can also be iteratively reduced as described herein. After the data bins processing and guard bins processing at 130 and 140 respectively, a time domain transform at 150 (e.g., Inverse Discrete Fourier Transform (IDFT)) can be applied to the processed frequency domain results. Output from the time domain transform can be processed by an Nth iteration block 160, where N is a positive integer and Nth refers to one or more subsequent iterations of the first iteration block 110. As each iteration is performed at 160, PAPR can be reduced until target system thresholds are met and EVM and spectral mask parameters are within desired threshold limits. After completion of the Nth iteration at 160, further signal processing can be performed at 170. This can include a final soft clipping operation, for example, to further reduce the PAPR.

The general operation of the PAPR module 100 includes methods as described herein to reduce PAPR over one or more processing iterations. Although described in more detail below, the methods includes various processing steps in the time domain and the frequency domain. For example, time domain processing at 120 includes reducing the PAPR of the OFDM signal while allowing potential degradation to EVM and spectral mask. This result can be transformed to frequency domain by discrete Fourier transform (DFT). The signal can be further processed in the frequency domain where bins are separated into data bins and guard bins, where a different formulation is applied to each group. One aspect of the frequency domain processing of the data bins is to control the signal quality that is typically quantified by the EVM parameter. The frequency domain processing of the guard bins (out-of-band bins) is to control the spectral mask according to a given threshold, for example. In some cases a third bins group can be processed which is pilot bins. Those are typically used for tracking purposes in OFDM receivers and we may be subject to frequency domain processing as described herein. After frequency domain processing, the processed signal can be transformed back to the time domain by an Inverse DFT (IDFT) operation. These results can then be reprocessed in a similar manner via the Nth iteration block 160.

Figure 2:
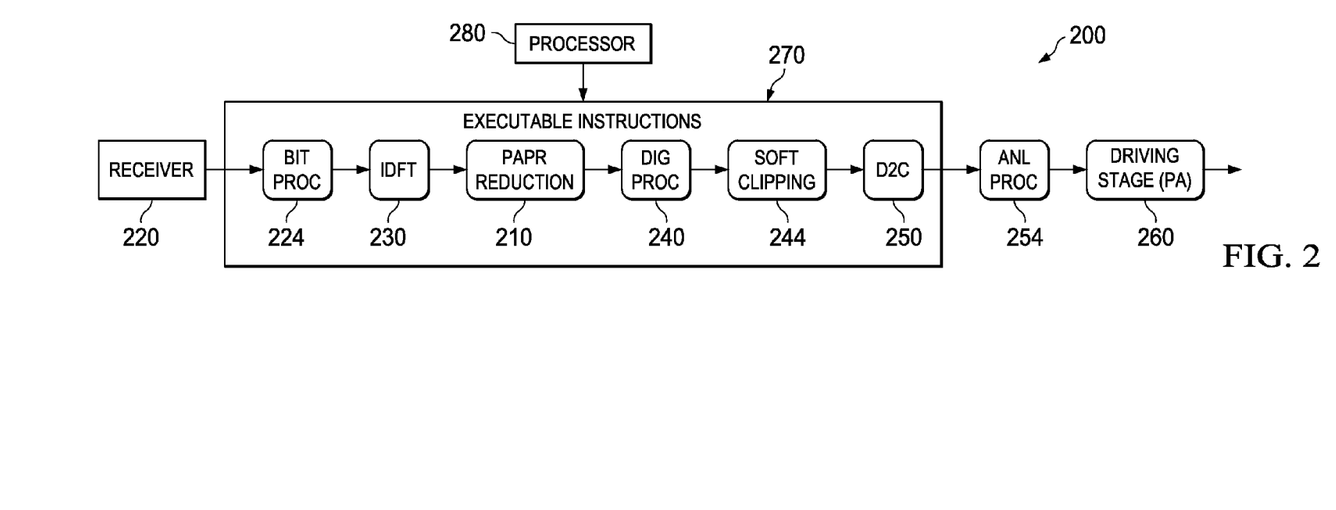
FIG. 2 illustrates an example block diagram of a system that employs a peak to average power ratio (PAPR) reduction module for reducing PAPR of orthogonal frequency division multiplexing (OFDM) signals while holding OFDM signal quality parameters within a desired range.

FIG. 2 illustrates an example block diagram of a system 200 that employs a peak to average power ratio (PAPR) reduction module 210 for reducing PAPR of orthogonal frequency division multiplexing (OFDM) signals while holding OFDM signal quality parameters within a desired range. The PAPR module 210 performs iterative processing as described above with respect to FIG. 1. Other aspects of the system 100 include a receiver 220 which can output a received OFDM signal to a bit processing stage 224 which can be transformed to the time domain via IDFT block 230. Output from the IDFT block is iteratively processed by the PAPR module 210 which can have its output digitally processed 240 before a soft clipping operation is performed at 244. A discrete to continuous transformation (D2C) can occur at 250 where analog processing can be applied 254 which is provided a power amplifier driving stage at 260. As shown, blocks 210, 224, 230, 240, 244, and 250 can be implemented as computer executable instructions 270 which can be executed by processor 280 (or processors).

Figure 3:
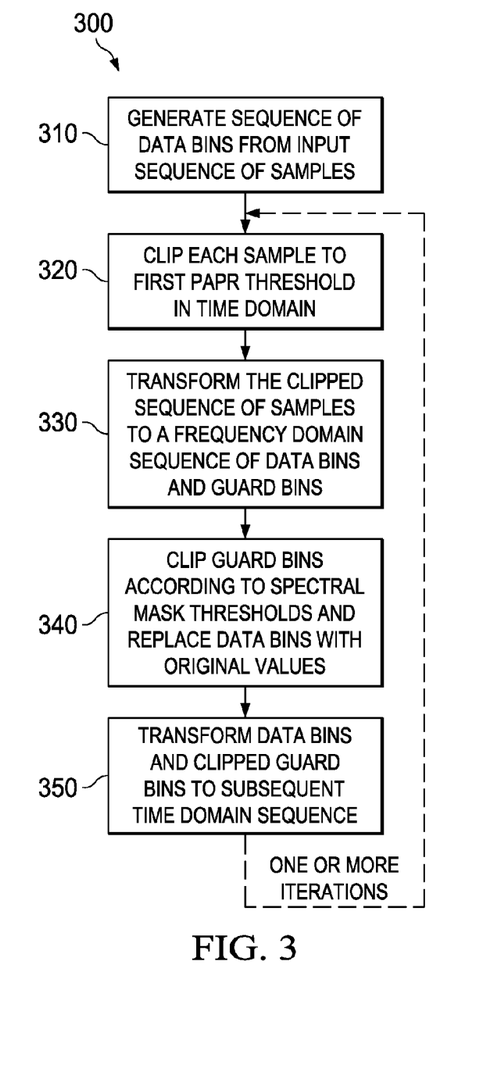
FIG. 3 illustrates an example method for reducing PAPR of orthogonal frequency division multiplexing (OFDM) signals while holding OFDM signal quality parameters within a desired range.
Figure 6:
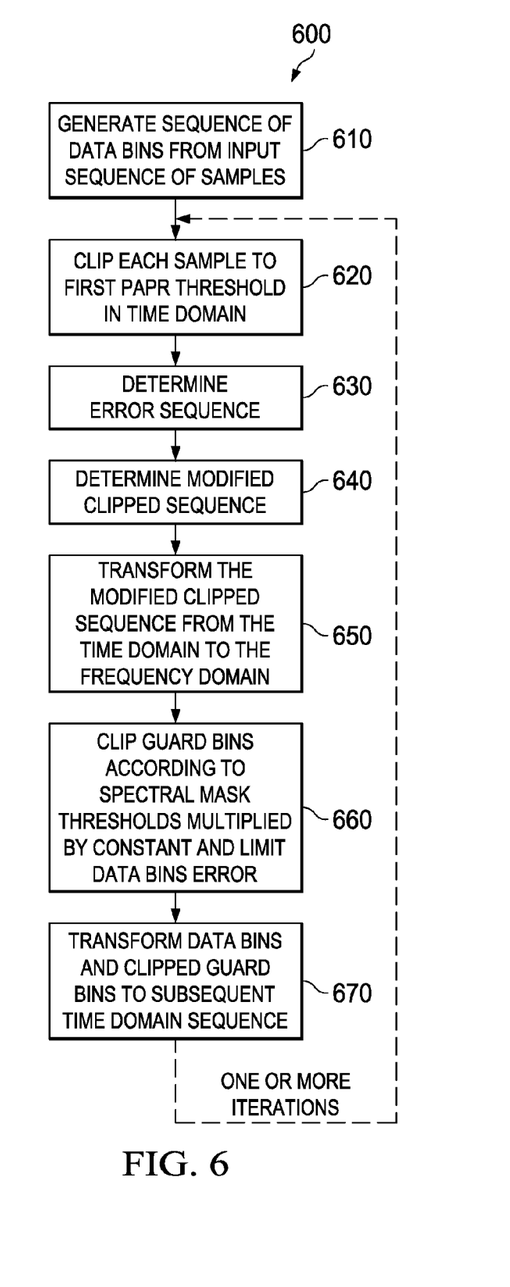
FIG. 6 illustrates an alternative example method for reducing PAPR of orthogonal frequency division multiplexing (OFDM) signals while holding OFDM signal quality parameters within a desired range.

In view of the foregoing structural and functional features described above, an example method will be better appreciated with reference to FIGS. 3 and 6. While, for purposes of simplicity of explanation, the methods are shown and described as executing serially, it is to be understood and appreciated that the methods are not limited by the illustrated order, as parts of the methods could occur in different orders and/or concurrently from that shown and described herein. Such methods can be executed by various components configured in an IC or a processor, for example.

FIG. 3 illustrates an example method 300 for reducing PAPR of orthogonal frequency division multiplexing (OFDM) signals while holding OFDM signal quality parameters within a desired range. The method 300 includes processing an input sequence of samples of an orthogonal frequency division multiplexing (OFDM) signal to reduce a peak to average power ratio (PAPR) of the OFDM signal with respect to an error vector magnitude (EVM) parameter and a spectral mask parameter for the OFDM signal during a first processing iteration. At 310, the method includes generating a sequence of data bins from the input sequence of samples of the OFDM signal by transforming the input sequence of samples into the frequency domain.

The OFDM symbol in time domain can be represented by a sequence of N complex samples: $x_1, x_2, \ldots, x_N$. Time domain representation is generated in the transmit path and sent to the receiver through the media. To generate the data bins at 310, perform a DFT operation on the input sequence $x_n$ to generate the frequency domain representation $X_n$. The DFT operation can be formulated by:

$$X_k = \frac{1}{N} \sum_{n=1}^{N} X_n e^{\frac{-j2\pi kn}{N}}$$

for $k=1, 2, \ldots, N$, where K elements of $X_k$ carry information and are referred as data bins (K<N) while other elements of $X'_n$ not carry information and are referred as guard bins.

The number of data bins varies between OFDM standards and systems. The number of samples per OFDM symbol N, is set by the system designer and should be greater than the number of data bins K. For convenience, the sequence $X_k$ can be re-ordered such that the first K bins of $X_n$ (K<N) are the data bins and the rest of the elements of $X_n$ are the guard bins. Any other form of indexing is also possible as long as a clear partition is maintained between data bins and guard bins. If there are pilot bins included in the signal, they can be processed as data-bins and included in the K bins mentioned above. The data bins $X_1, X_2, \ldots, X_K$ can be stored for use in later step. The DFT operation described above can typically be performed in the receiver side in order to extract the data bins.

At 320, the method 300 includes clipping an absolute value of each sample of the input sequence of samples of the OFDM signal in the time domain to a first PAPR threshold. The first PAPR threshold is set below system target PAPR thresholds. Soft clipping is applied to the input sequence $x_n$ and applies on each sample to a value A, which represents the PAPR threshold. This is one example for time domain processing, where A is a real number selected by the implementer according to system considerations of PAPR versus EVM and spectral mask. The value A can be set to achieve PAPR that is lower than the target and create temporary violation of EVM and spectral mask constraints, for example. This will be mitigated in the next operation described herein (e.g., in simulations the target PAPR was 4 dB and A in this stage was set to 3.5 dB PAPR). Denote the result sequence of this stage by $y_n$ and the soft clipping operation by SC(.), where $y_n = SC(x_n, A)$ for $n=1, 2, \ldots, N$. The SC operation can be defined by the following equation:

$$SC(x_n, A) = \begin{cases} x_n & \text{if } |x_n| \leq A \\ Ae^{j\theta} & \text{if } |x_n| > A \end{cases}$$

At 330, the method 300 includes transforming the clipped input sequence of samples from the time domain into a frequency domain sequence that includes the sequence of data bins and a sequence of guard bins in the frequency domain. Thus, process the sequence $y_n$ and apply the known Discrete Fourier Transform (DFT). The result can be denoted as $Y_n$ n=1, 2, . . . , N.

Figure 4:
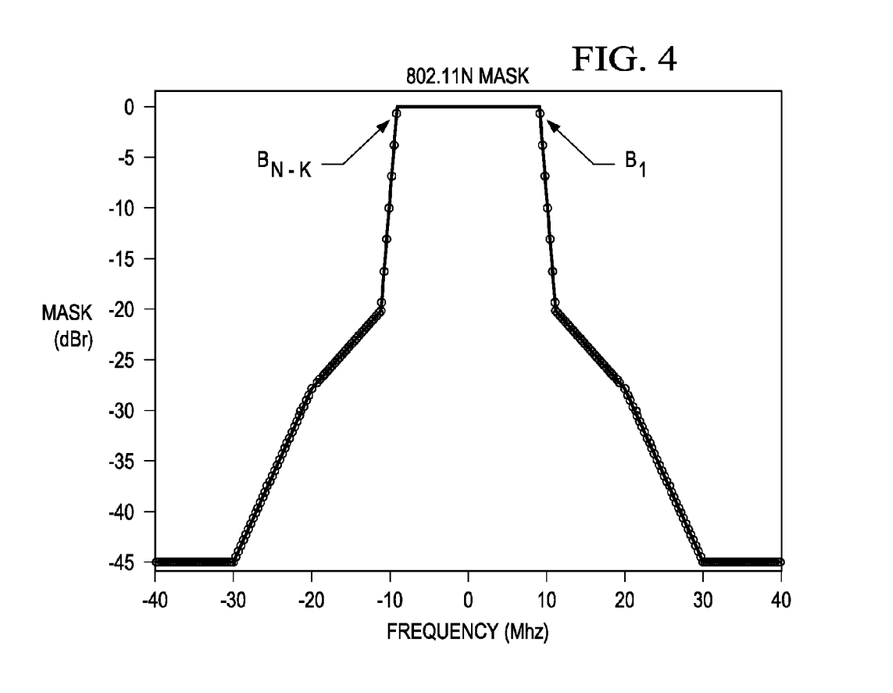
FIG. 4 illustrates an example of spectral mask constraints that are described with respect to the method of FIG. 3.

At 340, the method 300 includes clipping a value of each of the guard bins in the frequency domain sequence and replacing the data bins with their original values from 310. The guard bins are clipped according to spectral mask thresholds set for the spectral mask parameter. This includes creating a new sequence $Z_n$: where $$Z_n = \begin{cases} X_n & n = 1, 2, \ldots, K \text{ (These are the data bins)} \\ SC(Y_n, B_{n-K}) & n = K+1, \ldots, \text{ (These are the guard bins)} \end{cases}$$

and $X_n$ are the data bins that were calculated and stored at 310 of the method 300. The term $B_n$ is a sequence of N-K real numbers selected according to spectral mask constraints described herein. Referring briefly to FIG. 4, an example of spectral mask constraints are shown and utilized to extract the $B_n$ sequence. FIG. 4 depicts frequency in MHz along the horizontal axis versus spectral mask dBr thresholds along the vertical axis. At 340, the original data bins in the indices 1, 2, . . . , K of $Z_n$ are reproduced and soft clipped to $B_n$. This is one example for the frequency domain processing described above with respect to FIG. 1.

At 350, the method 300 includes transforming the data bins and the clipped guard bins from the frequency domain into a subsequent time domain sequence. This can include performing an IDFT operation to the sequence $Z_n$ generated at 340. This result can be denote the result by $z_n(1)$. A dashed line is shown representing that at least one other iteration of the first processing iteration from 310 to 350 can be performed on the subsequent time domain sequence to reduce the PAPR of the OFDM signal below the system target PAPR threshold and below threshold limits for the EVM parameter and the spectral mask parameter.

Thus, use $z_n(1)$ as the input to 320 instead of $x_n$ and repeat steps 320 through 350. The new result of 350 can be denoted as $z_n(2)$ to mark that this is the result of the second iteration. The iterations described can be repeated M times, where the result of the m iteration: $z_n(m)$ is taken as the input to the m+1 iteration. The term M may be set according to the available processing time and the desired quality of the end result, for example. The result of the last iteration $z_n(M)$ can be used as the output of the PAPR reduction block and fed to the next block in the transmit path. Another operation of soft clipping can be applied to the signal prior to the amplifier driving stage. It can be performed before or after the D2C in digital or analog domain respectively. The clipping threshold C of the last soft clipping operation is a real number set according to the desired PAPR. The input signal to the last soft-clipping operation can be denoted by $R_n$ where C may be set by:

$$C = \frac{\sqrt{\sum_{n=1}^{N} |R_n|^2}}{10^{(-PAPR/20)}}$$

where PAPR is the desired ratio between the peak and the RMS in dB. This operation facilitates that the signal fed into the last block in the transmit path has the desired PAPR value. The last stage in the transmit path drives the signal to the transmission media. Usually this stage is a type of power amplifier which consumes high amount of power. Thus, minimizing the PAPR of the input to this stage can be beneficial for optimizing the efficiency of the collective transmit chain.

Figure 5:
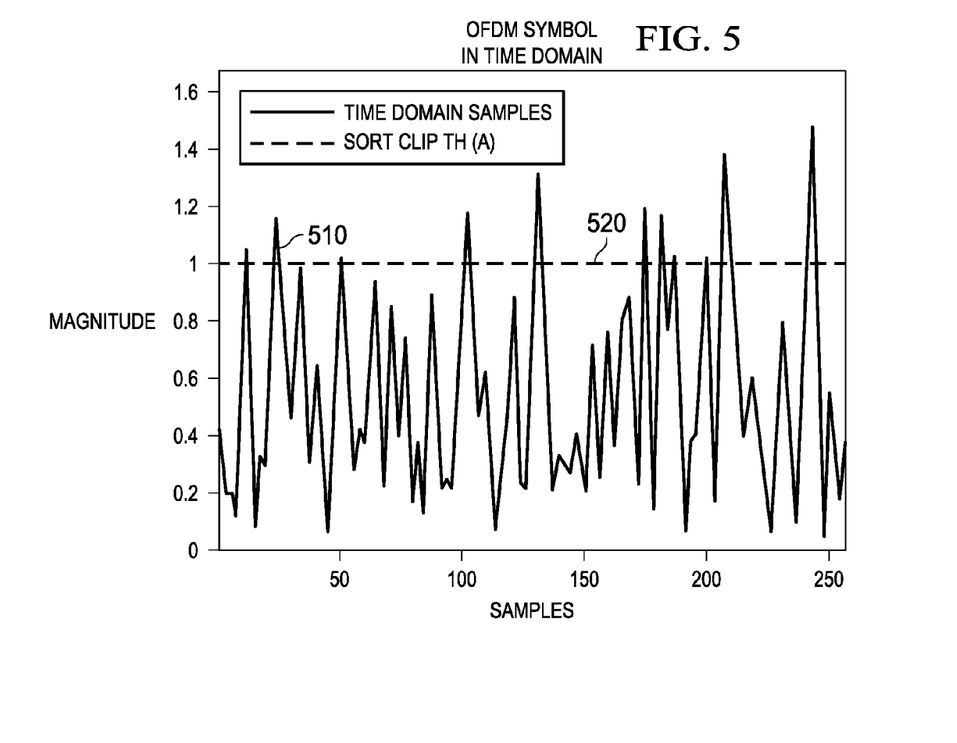
FIG. 5 illustrates an example OFDM signal in the time domain that can be processed according to the PAPR systems and methods described herein.

FIG. 5 illustrates an example OFDM signal in the time domain that can be processed according to the PAPR systems and methods described herein. A signal 510 represents a series of time domain samples. A line at 520 represents a soft clipping threshold (A) described above with respect to FIG. 3 which can be applied to the signal 510 to reduce PAPR. The signal 510 represents an OFDM symbol $x_n$ with N=256, K=52, for example. The method of FIG. 3 is then generally applied where X1, . . . , X52 are generated as described above with respect to 310 of FIG. 3. Then, set A=1 and generate $y_n$ as described at 320 of FIG. 3. Set Bn to values that represents spectral mask of 802.11n as illustrated in FIG. 4 and generate $Z_n$ as described at 340 of FIG. 3. Complete a first iteration as described above to yield $z_n(1)$. In this example, continue to iterate M=10 times, for example, and maintain intermediate results: $z_n(2), \ldots, z_n(9)$.

FIG. 6 illustrates an alternative example method 600 for reducing PAPR of orthogonal frequency division multiplexing (OFDM) signals while holding OFDM signal quality parameters within a desired range. In this method, more aggressive forms of signal clipping are applied which can reduce the number of iterations described above with respect to FIG. 3. At 610, the method 600 includes generating a sequence of data bins from an input sequence of samples of an orthogonal frequency division multiplexing (OFDM) signal by transforming the input sequence of samples into the frequency domain. At 620, the method 600 includes clipping an absolute value of each sample of the input sequence of samples of the OFDM signal in the time domain to a first PAPR threshold. The first PAPR threshold is set below system target PAPR thresholds.

At 630, the method 600 includes determining an error sequence by subtracting the values of the clipped input sequence of samples from the values of the input sequence of samples. At 640, the method 600 includes determining a modified clipped sequence by clipping each sample of the input sequence of samples and subtracting each value of the error sequence multiplied by a constant from each value of the clipped sequence. The error sequence can be defined as $e_n = x_n - SC(x_n, A)$
and $y_n = SC(x_n) - \mu e_n$ where $\mu$ is a constant set by system designer. The term $\mu=0$ reverts back to soft clipping as in the basic implementation described above with respect to 320 of FIG. 3 while $\mu>0$ applies more aggressive clipping that pulls the peaks which lays outside the circle with radius A into the circle instead of to the edge of the circle. As used herein the circle refers to the complex plane where all points on the circle have the same amplitude (r) and varied along the circle via the phase.

The soft clipping operation described above with respect to 320 of FIG. 3 takes each point outside this circle and "pulls" it to the edge of the circle while keeping the same phase. It implies that each sample in time-domain that has amplitude greater than r will be clipped to r and the phase will remain the same. In the accelerated method 600 of FIG. 6, a similar action of reducing the amplitude is performed while maintaining the phase but PAPR reduction is applied more aggressively. Thus, instead of clipping to the edge of the circle by setting the amplitude to r, the error sequence processing of 630 and 640 reduce the amplitude of those points to less than r (meaning into the circle).

At 650, the method 600 includes transforming the modified clipped sequence from the time domain into a frequency domain sequence that includes the sequence of data bins, a sequence of pilot bins, and a sequence of guard bins in the frequency domain. At 660, the method 600 includes clipping a value of each of the guard bins in the frequency domain sequence. The guard bins are clipped according to a constant value multiplied by spectral mask thresholds set for the spectral mask parameter and limit the data bins error. In this example, frequency domain processing includes sequences:

$$Z_n = \begin{cases} \tilde{X}_n & n = 1, 2, \ldots, K \text{ except pilot bins (data bins)} \\ X_n & \text{pilot bins} \\ SC(G*Y_n, B_{n-K}) & n = K+1, \ldots, N \text{ (guard bins)} \end{cases}$$

$$\tilde{X}_n = \{\text{real}(X_n) - \min(|X_n - \text{real}(Y_n)|, r)\} +$$

$$j*\{\text{imag}(X_n) - \min(|X_n - \text{imag}(Y_n)|, r)\} \text{ and } r = \sqrt{\frac{\beta * E\{|x_n|^2\}}{2}}$$

G and β are real numbers selected by the system designer. In these settings, the data bins adjusted but still allowing a certain error with respect to their original value which depends on the parameter β (in contrast to the basic scheme). The term β is set according to the target EVM. Accordingly, the EVM is still held in the desired range while limiting the increase in PAPR associated with frequency domain processing. This operation creates "small squares" around each constellation point in the IQ domain, for example and pilot bins are placed back to their original value. Generally, substantially no error is permitted on pilot bins to mitigate tracking errors in the receiver side. For the guard bins, add a factor G before performing soft clipping to $\beta_n$. This enables growing some additional energy in the guard-bins while keeping the spectral mask in the desired range.

$$Z_n = \begin{cases} \tilde{X}_n & n = 1, 2, \ldots, K \text{ except pilot bins (data bins)} \\ X_n & \text{pilot bins} \\ SC(G*Y_n, B_{n-K}) & n = K+1, \ldots, N \text{ (guard bins)} \end{cases}$$

$$\tilde{X}_n = \{\text{real}(X_n) - \min(|X_n - \text{real}(Y_n)|, r)\} +$$

$$j*\{\text{imag}(X_n) - \min(|X_n - \text{imag}(Y_n)|, r)\}$$

At 670, the method 600 includes transforming the data bins, the pilot bins, and the clipped guard bins from the frequency domain into a subsequent time domain sequence. As shown via dashed line, the method can include repeating the generating the clipping of the absolute value of each sample 620, determining an error sequence at 630, determining a clipped sequence at 640, transforming the clipped sequence at 650, clipping the value of each of the guard bins at 660, and transforming the data bins on the subsequent time domain sequence to reduce the PAPR of the OFDM signal below the system target PAPR threshold.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A method comprising:
   receiving an input sequence of samples of an orthogonal frequency division multiplexing (OFDM) signal;
   iterating to reduce a peak to average power ratio (PAPR) of the OFDM signal below a system target PAPR threshold with given constraints of an error vector magnitude (EVM) parameter and a spectral mask parameter, each iteration comprising:
     clipping an absolute value of each sample of the OFDM signal in the time domain to reduce the PAPR below a threshold, wherein the threshold is less than the system target PAPR threshold;
     transforming the clipped OFDM signal to the frequency domain;
     segmenting the clipped OFDM signal in the frequency domain into data bins and guard bins;
     clipping a value of each of the guard bins according to spectral mask thresholds set according to the spectral mask parameter; and
     transforming the data bins and the clipped guard bins from the frequency domain into a subsequent time domain sequence; and
   in response to the PAPR of the subsequent time domain sequence being reduced below the system target PAPR threshold with the given constraints of the EVM parameter and the spectral mask parameter, performing a final soft clipping of the subsequent time domain sequence in accordance with a soft clipping threshold set as a function of the system target PAPR,
   wherein the final soft clipping further reduces the PAPR of the subsequent time domain sequence to minimize power employed by an amplifier of the subsequent time domain sequence.

2. The method of claim 1, wherein the transforming the clipped OFDM signal from the time domain into the frequency domain is performed via a Discrete Fourier Transform (DFT), and the transforming the data bins and the clipped guard bins from the frequency domain into the subsequent time domain sequence is performed via an inverse DFT (IDFT).

3. The method of claim 2, wherein the input sequence of samples is represented as $x_n$ and the clipped input sequence is represented as $$X_k = \frac{1}{N}\sum_{n=1}^{N} X_n e^{\frac{-j2\pi kn}{N}}$$

for k=1, 2, . . . , N, where N is a number of samples, and where K elements of $X_k$ carry information as the data bins (K<N) while other elements of $X_n$ do not carry information and are the guard bins.

4. The method of claim 1, wherein the clipping of the absolute value of each sample is described in a clipped sequence as $y_n = SC(x_n, A)$ for n=1, 2, . . . , N, where A is a PAPR threshold value applied to clip OFDM symbols in the time domain and SC is a soft clipping function.

5. The method of claim 4, wherein the soft clipping function SC is defined as $$SC(x_n, A) = \begin{cases} x_n & \text{if } |x_n| \le A \\ Ae^{j\theta} & \text{if } |x_n| > A \end{cases}.$$

6. The method of claim 1, wherein the spectral mask parameter is selected according to spectral mask thresholds for a sequence of real numbers derived from an 802.11n standard defining spectral mask constraints.

7. The method of claim 1, wherein the soft clipping threshold C defined by $$C = \frac{\sqrt{\sum_{n=1}^{N} |R_n|^2}}{10^{(-PAPR/20)}}$$

where PAPR is the system target PAPR threshold based on a desired ratio between a peak signal value and the RMS in dB, N is a number of samples, and R corresponds to values of the subsequent time domain sequence input to the final soft-clipping operation.

8. A method comprising:
receiving an orthogonal frequency division multiplexing (OFDM) signal;
iterating to reduce the PAPR of the OFDM signal with given constraints of an error vector magnitude (EVM) parameter and a spectral mask parameter, the iterating comprising:
  clipping an absolute value of each sample of the OFDM signal in the time domain to reduce the PAPR below a threshold, wherein the threshold is less than a system target PAPR threshold;
  determining an error sequence by subtracting values of the clipped OFDM signal from values of the OFDM signal samples;
  subtracting each value of the error sequence multiplied by a constant from each sample value of the clipped OFDM signal to determine a modified clipped OFDM signal;
  transforming the modified clipped OFDM signal from the time domain into the frequency domain;
  segmenting the modified clipped OFDM signal in the frequency domain into data bins, pilot bins, and guard bins;
  clipping a value of each of the guard bins according to a second constant multiplied by spectral mask thresholds set for the spectral mask parameter, wherein the second constant is set based on the EVM parameter; and
  transforming the data bins, the pilot bins, and the clipped guard bins from the frequency domain into a subsequent time domain OFDM signal,
when the PAPR of the subsequent time domain OFDM signal is reduced below the system target PAPR threshold with the given constraints of the EVM parameter and the spectral mask parameter, performing a final soft clipping of the subsequent time domain OFDM signal in accordance with a soft clipping threshold set based on the system target PAPR threshold.

9. The method of claim 8, wherein the soft clipping threshold (C) is defined as $$C = \frac{\sqrt{\sum_{n=1}^{N} |R_n|^2}}{10^{(-PAPR/20)}},$$

where PAPR is the system target PAPR threshold based on a desired ratio between a peak signal value and the RMS in dB, N is a number of samples, and R corresponds to values of the subsequent time domain OFDM signal input to the final soft-clipping operation.

10. The method of claim 8, wherein no error is permitted on the pilot bins to mitigate tracking errors during the clipping of the guard bins.

11. The method of claim 8, further comprising adding the second constant to the guard bins before the clipping of the guard bins to grow energy in the guard bins.

12. The method of claim 8, wherein the error sequence is determined according to $e_n = x_n - SC(x_n, A)$ where A is the threshold applied to the clipped OFDM signal and SC is a soft clipping function.

13. The method of claim 12, wherein the modified clipped OFDM signal is determined according to $y_n = SC(x_n) - \mu e_n$ where $\mu$ is the constant.

14. A system comprising:
a receiver to receive an orthogonal frequency division multiplexing (OFDM) signal;
a processor to process an input sequence of samples from the OFDM signal; and
a peak to average power ratio (PAPR) module operated by the processor to iteratively reduce the PAPR of the OFDM signal with given constraints of an error vector magnitude (EVM) parameter and a spectral mask parameter, the PAPR module comprises instructions stored in a non-transitory memory and executable by the processor, upon execution the instructions cause the PAPR module to:
  clip an absolute value of each sample of the OFDM signal in the time domain to reduce the PAPR below a threshold, wherein the threshold is less than a system target PAPR threshold;
  determine an error sequence by subtracting values of the clipped OFDM signal from values of the OFDM signal;
  subtract each value of the error sequence multiplied by a constant from each value of the clipped OFDM signal to determine a modified clipped OFDM signal;
  transform the modified clipped OFDM signal from the time domain into the frequency domain;
  segment the modified clipped OFDM signal in the frequency domain into data bins, pilot bins, and guard bins;
  clip a value of each of the guard bins scaled by a second constant according to spectral mask thresholds set for the spectral mask parameter, wherein the second constant is set based on the EVM parameter; and
  transform the data bins, the pilot bins, and the clipped guard bins from the frequency domain into a subsequent time domain OFDM signal,
when the PAPR of the subsequent time domain OFDM signal is reduced below the system target PAPR threshold with the given constraints of the EVM parameter and the spectral mask parameter, perform a final soft clipping of the subsequent time domain OFDM signal in accordance with a soft clipping threshold set based on the system target PAPR threshold.

15. The system of claim 14, wherein the error sequence is determined according to $e_n = x_n - SC(x_n, A)$ where A is the threshold applied to the clipped OFDM signal and SC is a soft clipping function.

16. The system of claim 14, wherein the modified clipped OFDM signal is determined according to $y_n = SC(x_n) - \mu e_n$ where $\mu$ is the constant and $e_n$ is a value of the error signal.

* * * * *